United States Patent [19]

Roy et al.

[11] Patent Number: 4,983,282
[45] Date of Patent: Jan. 8, 1991

[54] APPARATUS FOR REMOVING LIQUID FROM A COMPOSITION AND FOR STORING THE DELIQUIFIED COMPOSITION

[75] Inventors: Bryan A. Roy, Harrison; Gregory F. Boris, Sewell, both of N.J.; John J. Campbell, Prospect Park, Pa.; John G. Funk, Raleigh, N.C.; David J. Wozniak, Gloucester, N.J.; James D. Gibson, Voorhees, N.J.; Robert M. McCauley, Vincentown, N.J.

[73] Assignee: Westinghouse Electric Corp., Pittsburgh, Pa.

[21] Appl. No.: 460,672

[22] Filed: Nov. 16, 1989

Related U.S. Application Data

[63] Continuation of Ser. No. 283,408, Dec. 12, 1988, abandoned.

[51] Int. Cl.$^5$ ............................................. B01D 63/00
[52] U.S. Cl. ..................................... 210/95; 210/104; 210/257.2; 210/258
[58] Field of Search ............... 210/770, 224, 153, 170, 210/172, 86, 90, 94, 95, 97, 103, 104, 109, 112, 195.2, 252, 257.1, 257.2, 258, 259–262, 321.6, 321.72; 100/104, 116, 110, 125, 126, 131, 269 R, 211, 214, 218, 226, 240, 269 A

[56] References Cited

U.S. PATENT DOCUMENTS

| | | |
|---|---|---|
| H,152 | 11/1986 | Lampe . |
| 3,205,588 | 9/1965 | Oetjen et al. . |
| 3,361,649 | 1/1968 | Karter . |
| 3,658,179 | 4/1972 | Baumann et al. . |
| 3,749,917 | 7/1973 | Kucherer . |
| 3,872,009 | 3/1975 | Thijssen . |
| 3,900,403 | 8/1975 | Randle et al. . |
| 4,056,362 | 11/1977 | Gablin et al. . |
| 4,058,479 | 11/1977 | White et al. . |
| 4,061,575 | 12/1977 | Randle . |
| 4,107,044 | 8/1978 | Levendusky . |
| 4,168,243 | 9/1979 | Gablin et al. . |
| 4,209,420 | 6/1980 | Larker . |
| 4,422,964 | 12/1983 | Capolupo . |
| 4,440,673 | 4/1984 | Ambros et al. . |
| 4,473,529 | 9/1984 | Boccon-Gibod . |
| 4,499,833 | 2/1985 | Grantham . |
| 4,559,170 | 12/1985 | Gay et al. . |
| 4,566,204 | 1/1986 | Fiesner et al. . |
| 4,579,069 | 4/1986 | Gay et al. . |
| 4,582,099 | 4/1986 | McDaniel et al. . |
| 4,592,192 | 6/1986 | Jacob et al. . |
| 4,594,513 | 6/1986 | Suzuki et al. . |
| 4,595,528 | 6/1986 | Greenhalgh . |
| 4,610,568 | 9/1986 | Koerner . |
| 4,616,959 | 10/1986 | Hilfiker . |
| 4,626,414 | 12/1986 | Baatz et al. . |
| 4,650,086 | 3/1987 | Morrison, Jr. . |
| 4,654,172 | 3/1987 | Matsuda et al. . |
| 4,668,388 | 5/1987 | Dibble et al. . |
| 4,675,129 | 6/1987 | Baatz et al. . |
| 4,688,389 | 5/1987 | Eriksson . |
| 4,774,009 | 9/1988 | Hensley et al. . |
| 4,836,934 | 6/1989 | Homer . |
| 4,836,937 | 6/1989 | Homer . |

FOREIGN PATENT DOCUMENTS 0238895 9/1987 European Pat. Off. .
62-210018 9/1987 Japan .

OTHER PUBLICATIONS

Exhibit 1: A Technical Paper Titled "Dewatering Radioactive Resins & Filer Sludge, A Vacuum Compression (List continued on next page.)

Primary Examiner—Frank Sever
Attorney, Agent, or Firm—Walter S. Stevens

[57] ABSTRACT

Apparatus for dewatering radioactive waste slurry solids. The apparatus includes a vacuum pump for applying a vacuum to a suitable flexible filter and collapsible membrane combination in which the slurry solids are contained so that the slurry solids are compressively dewatered when the vacuum is applied. The apparatus further includes a container for suitably storing the resulting dewatered slurry solids.

33 Claims, 8 Drawing Sheets

OTHER PUBLICATIONS

Systems" by J. C. Homer and S. B. McCoy allegedly presented at a Mar. 1987 symposium.

Exhibit 2: A Technical Paper Titled "Dewatering Radioactive Resins & Filer Sludge, A Vacuum Compression System" by J. C. Homer and S. B. McCoy. This paper is allegedly an updated version of the technical paper presented as Exhibit 1.

Exhibit 3: Electronic Mail message from D. A. Zigelman to J. Thomas, Subject: Customer Contact Report dated Feb. 25, 1988.

Co-pending Application "Volumetrically Efficient Container Apparatus" by Bryan A. Roy et al., U.S. Ser. No. 07/283,412, Filed Dec. 12, 1988.

Marketing Brochure "Radioactive Dewatering Services" authored by Hittman Nuclear Incorporated, distributed to potential customers approximately Mar., 1988.

Marketing brochure "Radioactive Waste Solidification Services" authored by Hittman Nuclear Incorporated, distributed to potential customers approximately, Mar. 1988.

Letter with attached document from Ronald A. Sharp, Senior Technical Representative, Hittman Nuclear to S. L. Mills, Cleveland Electric Illuminating Company dated Nov. 13, 1987.

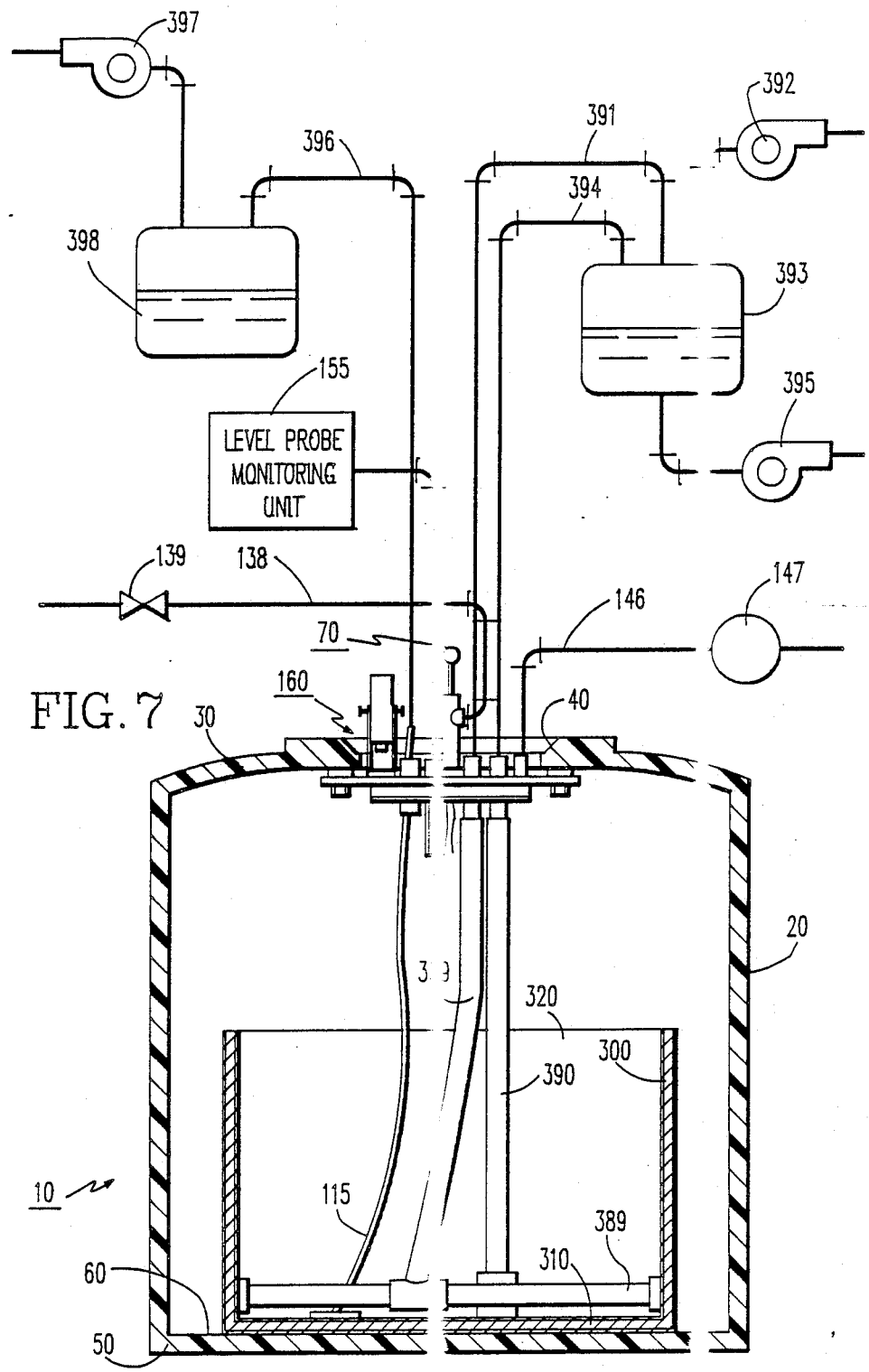

APPARATUS FOR REMOVING LIQUID FROM A COMPOSITION AND FOR STORING THE DELIQUIFIED COMPOSITION

This is a continuation of co-pending application Ser. No. 07/283,408, filed on Dec. 12, 1988, now abandoned.

BACKGROUND OF THE INVENTION

This invention generally relates to apparatus for removing liquid from a composition and for storing the deliquified composition and more particularly relates to an apparatus for dewatering radioactive waste slurry solids, wherein the apparatus includes means for applying a vacuum to a suitable flexible filter and collapsible membrane combination in which the slurry solids are contained so that the slurry solids are compressively dewatered when the vacuum is applied and further includes means for suitably storing the resulting dewatered slurry solids.

Radioactive waste slurry solids generated by nuclear reactor power plants, governmental operations, hospitals and the like are packaged in containers for disposal at burial sites licensed by the United States government for such disposal. Often these wastes are in the form of spent ion exchange resins, filter media, waste sludge, chemical precipitates, and similar granular-type slurry media which result from water treatment processes in the facilities generating the wastes.

With particular reference to nuclear reactor power plants, a liquid moderator circulating through the reactor typically has dissolved and suspended radioactive solids therein. These solids usually are fission and corrosion products formed from within the plant piping system and plant equipment through which the moderator circulates. As well understood in the art of health physics, the radioactive liquid moderator should be kept reasonably free from such fission and corrosion products during plant operation because the radiation fields surrounding the reactor have to be maintained at a low level for biological and health reasons. Therefore, the liquid moderator is typically recirculated and filtered through ion-exchange resin beds to remove the dissolved and suspended radioactive solids. As well known in the chemical arts, an ion-exchange resin is usually a synthetic material or a natural or synthetic mineral that adsorbs an ion from solution in exchange for a less strongly held ion that previously formed part of the structure of the resin. Solid waste is deposited in the resin bed by the nuclear power plant during moderator filtering and water cleaning operations because removal of the suspended solids from the liquid moderator results in an accumulation of radioactive waste material in the resin bed. After the accumulation of radioactive material in the resin bed reaches a predetermined level, the resin is typically removed, placed into a suitable disposal container and transported to an appropriate disposal site. However, such waste, which may be in the form of spent ion-exchange resin slurry, contains a substantial amount of water and accumulated radionuclides. Moreover, some of these radionuclides may have a half-life of several hundred years and therefore should be isolated from the biosphere at least until the radiation emitting from the radionuclides has decreased to an acceptable level.

Burial of low-level radioactive wastes, such as spent ion-exchange resins, is a relatively inexpensive means for isolating the radionuclides and for providing adequate long-term shielding from the radiation emitting from the radionuclides in the wastes. However, such burial raises the possibility of leaching by water and the concomitant possibility of contamination of nearby ground water. Therefore, when burial is used as means for waste disposal, it is desirable to dewater the waste to reduce its volume and to enclose the waste in waterproof and generally leak-tight containers before burial to reduce the risk of contamination of nearby ground water.

A filter-lined container for storing hazardous solids, such as radioactive wastes, is disclosed by U.S. Pat. No. 4,058,479 issued Nov. 15, 1977, in the name of Leslie E. White, et al. entitled "Filter-Lined Container for Hazardous Solids". The White, et al. patent discloses a package for storing toxic solids in which package the stored solids are homogeneously dispersed in an immobilization material and also completely surrounded by a layer of the immobilization material. According to the White et al. patent, a tight mesh fabric bag is inserted into a barrel. The bag is filled with particulate radioactive waste material and a non-radioactive liquid that mixes with the radioactive waste material. The tight mesh of the fabric bag acts as a barrier to the solid waste, but not to the liquid. According to this patent, a portion of the liquid flows through the bag as it is filled to form a layer of non-radioactive material between the bag and the barrel wall. A substantial quantity of liquid stays inside the bag in mixture with the radioactive solids. Therefore, the White et al. patent appears to contemplate a waste container wherein the waste retains a substantial quantity of liquid. Thus, although this patent discloses a container for storing radioactive solids, this patent does not appear to disclose an apparatus and method for substantially dewatering wastes and for storing the dewatered waste in a suitable container.

An apparatus for removal of liquid from a waste burial container holding a slurry of waste material is disclosed by U.S. Pat. No. 4,582,099 issued Apr. 15, 1986, in the name of Keith K. McDaniel et al. entitled "Waste Slurry Liquid Removal System" and assigned to the Westinghouse Electric Corporation. The apparatus is provided inside a burial container and has plastic filtration tubes, which are arrayed in a multilayered configuration, extending radially from centrally located liquid withdrawal pipes. The filtration tubes have pores of a predetermined, controlled size. A combination fill head and suction head located at the opening of the container provides a system for adding waste slurry material while applying suction to one or more of the drainage layers defined by the multilayered configuration of the filtration tubes so that the liquid filtered from the slurry is removed from the container by passing through the pores of the filtration tubes. Although the McDaniel et al. patent discloses an apparatus for removal of liquid from a waste burial container, the McDaniel et al. patent does not appear to disclose an apparatus and method for dewatering wastes by compression as well as suction and for storing the dewatered wastes in a suitable container.

An apparatus for separating liquid-solid mixtures such as water from ion exchange resins and storing the separated out solids in a vessel are disclosed by U.S. Pat. No. 3,658,179 issued Apr. 25, 1972 in the name of Gustav Baumann entitled "Method for Separating Liquid from Solid Substances and Storing the Solid Substances". The Baumann patent discloses a self-supporting cylindrical sieve arranged in a storage vessel. A suction pipe is introduced from the top of the vessel into an annular space between the vessel wall and the sieve. The waste resin, which contains water, is caused to flow into the sieve which filters the waste allowing the filtered water to accumulate on the bottom of the vessel. The filtered water is then drained from the bottom of the vessel through the suction pipe. After the water is drained off, the remaining cavities in the waste resin and particularly the annular space between the vessel wall and the sieve are filled with a water-binding and ionizing radiation-absorbing agent such as a cement broth. The vessel is then tightly sealed for storage. Although the Baumann patent discloses an apparatus and method for separating liquid-solid mixtures, the Baumann patent does not appear to disclose an apparatus for dewatering wastes and for storing the dewatered wastes in a suitable container, wherein the apparatus includes means for applying a vacuum to a flexible filter and collapsible membrane combination in which the waste is contained for compressively dewatering the waste.

Consequently, although the patents recited hereinabove disclose various apparatus for removing water from aqueous waste particulates or slurry, these patents do not appear to disclose an apparatus for deliquifying aqueous waste slurry solids, wherein the apparatus includes means for applying a vacuum to a suitable flexible filter collapsible membrane combination for compressively deliquifying the slurry solids and further includes means for suitably storing the deliquified slurry solids.

Therefore, what is needed is an apparatus for dewatering radioactive waste slurry solids, wherein the apparatus includes means for applying a vacuum to a suitable flexible filter and collapsible membrane combination in which the slurry solids are contained so that the slurry solids are compressively dewatered when the vacuum is applied and further includes means for suitably storing the resulting dewatered slurry solids.

SUMMARY OF THE INVENTION

The apparatus of the invention comprises a leak-tight outer container having a plurality of flexible porous filters therein which may be configured in the shape of a hollow cylinder having at least one of the filters extending substantially across the bottom end of the cylinder. The filters thus configured define a chamber open at one end for receiving substantially all the aqueous slurry transferred into the outer container. The filters are constructed such that they are at once self-supporting as well as flexible. The outer container has an opening in one end thereof which is sealingly covered by an upper fill plate disposed inside the outer container. Disposed in the outer container below the upper fill plate is a lower fill plate connected to the upper fill plate by a collapsible bellows. Interposed between the outer container and the filter and clamped to the lower fill plate is a non-porous flexible membrane which is capable of collapsing about the filters for compressing the aqueous slurry solids. Formed through the upper fill plate is a first vent opening in communication with the interior of the membrane for venting the interior of the membrane to the atmosphere. The outer container and the collapsible membrane define a space therebetween. Also formed through the upper fill plate is a second vent opening which connects the space, defined by the outer container and the collapsible membrane, to the ambient environment external to the outer container. The upper fill plate further includes a plurality of apertures to provide connections for dewatering hoses and to provide connections for a plurality of conduits. The dewatering hoses are connected to the filters and are used to dewater the slurry. The conduits are used to verify that the slurry is sufficiently dewatered and to verify that the collapsible membrane has not been inadvertently breached, such as by tearing of the membrane during the dewatering process. The upper fill plate also has an aperture for filling the membrane and the chamber with the slurry to be dewatered. Also formed in the upper fill plate is an observation window configured for observing the interior of the apparatus. Moreover, the upper fill plate also includes at least one level probe and at least one temperature probe extending therefrom and into the membrane for monitoring the level of the slurry in the membrane and for measuring the temperature of the slurry, respectively.

Another embodiment of the invention contemplates the apparatus of the invention without a collapsible membrane disposed in the outer container. In this second embodiment of the invention, the outer container itself functions as a collapsible membrane for compressing the slurry therein in the manner of the first embodiment of the invention.

A third embodiment of the invention also contemplates the apparatus of the invention without a collapsible membrane. In this third embodiment of the invention, an underdrain system is used to dewater the slurry solids.

The method of the invention includes transferring the aqueous slurry through an aperture in the upper fill plate and into the collapsible membrane while the vent opening to the interior of the membrane is open. As the slurry is transferred, a vacuum is applied to each dewatering hose and thus each filter by operating the vacuum pump associated with the dewatering hoses. The vacuum causes the interstitial water entrained in the slurry solids to leave the slurry solids and to filter through the filters. Thus, the suction action of the vacuum causes the water to flow from the slurry and through the filters, and from the filters into each dewatering hose which is in fluid communication with each associated filter. After a substantial quantity of the easily-removable excess water from the slurry solids is removed via these dewatering hoses, the fill aperture and first vent opening communicating with the inside of the membrane are sealingly closed. While the fill aperture and first vent opening remain closed, the vacuum continues to be applied to the filters inside the membrane, which vacuum produces a differential pressure across the membrane and causes the membrane to collapse about the flexible filters and the slurry solids therein. As the membrane collapses, it compresses the partially dewatered slurry solids, thereby forcing more water out of the interstitial spaces of the slurry solids and through the filters. The vacuum in each dewatering hose, which is in fluid communication with each associated filter, causes the water to flow from the slurry, through the dewatering hoses and out through the aperture to which the dewatering hoses are connected. This step of the dewatering process is complete when substantially no water flows through the dewatering hoses and when the applied vacuum reaches a relatively high value. As the next step in the process, the aperture used for filling the apparatus with the slurry solids and the vent opening communicating with the inside of the membrane are reopened for transferring more slurry into the membrane, if desired, based on available volume remaining in the membrane. The steps recited hereinabove are repeated until the membrane is filled to the desired level with dewatered slurry solids (i.e., separated-out solids). Following completion of the dewatering process, a vacuum is applied to the conduit connected to the bottom-most filter located at or near the bottom of the membrane. In this manner, this conduit is used to verify that the dewatering operation is complete when substantially no water flows through this conduit from the bottom-most filter. Moreover, vacuum is also applied to the conduit extending through the space defined by the membrane and the outer container. In this manner, this conduit is used to verify that the membrane has not been breached if no water flows through this conduit which terminates near the bottom of the outer container.

The method of the invention also contemplates using the deliquified slurry solids for internally supporting the outer container. In this regard, after the slurry solids are sufficiently dewatered, any unused volume between the outer container and the membrane is backfilled through the second vent opening with a substantially incompressible backfill material. The outer container, having the backfill material and dewatered slurry solids therein, is resistant to deformation because, under the imposed burial loads, the slurry solids and backfill material will not compress further.

Therefore, an object of the invention is to provide an apparatus for removing fluid from a composition.

Another object of the invention is to provide an apparatus for removing water from aqueous radioactive slurry solids and suitably storing the dewatered slurry solids for burial.

Yet another object of the invention is to provide an apparatus for dewatering aqueous slurry solids by compressively removing water from the slurry solids.

Still another object of the invention is to provide means for internally supporting the apparatus by using the dewatered slurry solids and backfill material.

A further object of the invention is to provide means for verifying that the slurry solids are sufficiently deliquified to comply with United States government regulatory requirements for burial of the slurry solids.

Another object of the invention is to provide means for rapidly dewatering the slurry solids by applying relatively high vacuum to a plurality of volumetrically efficient flexible filters.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 7 illustrates a second embodiment of the invention;

FIG. 9 illustrates in partial vertical section an underdrain belonging to the third embodiment of the invention.

DESCRIPTION OF THE PREFERRED EMBODIMENTS

First Embodiment of the Invention

Burial of liquified radioactive wastes introduces the possibility of ground water contamination. When burial is used as means for waste disposal, it is desirable to deliquify the waste and enclose the waste in a suitable leak-tight container before burial. Described hereinbelow are an apparatus for dewatering aqueous radioactive waste slurry solids and for suitably storing the resulting dewatered slurry solids.

Figure 1:
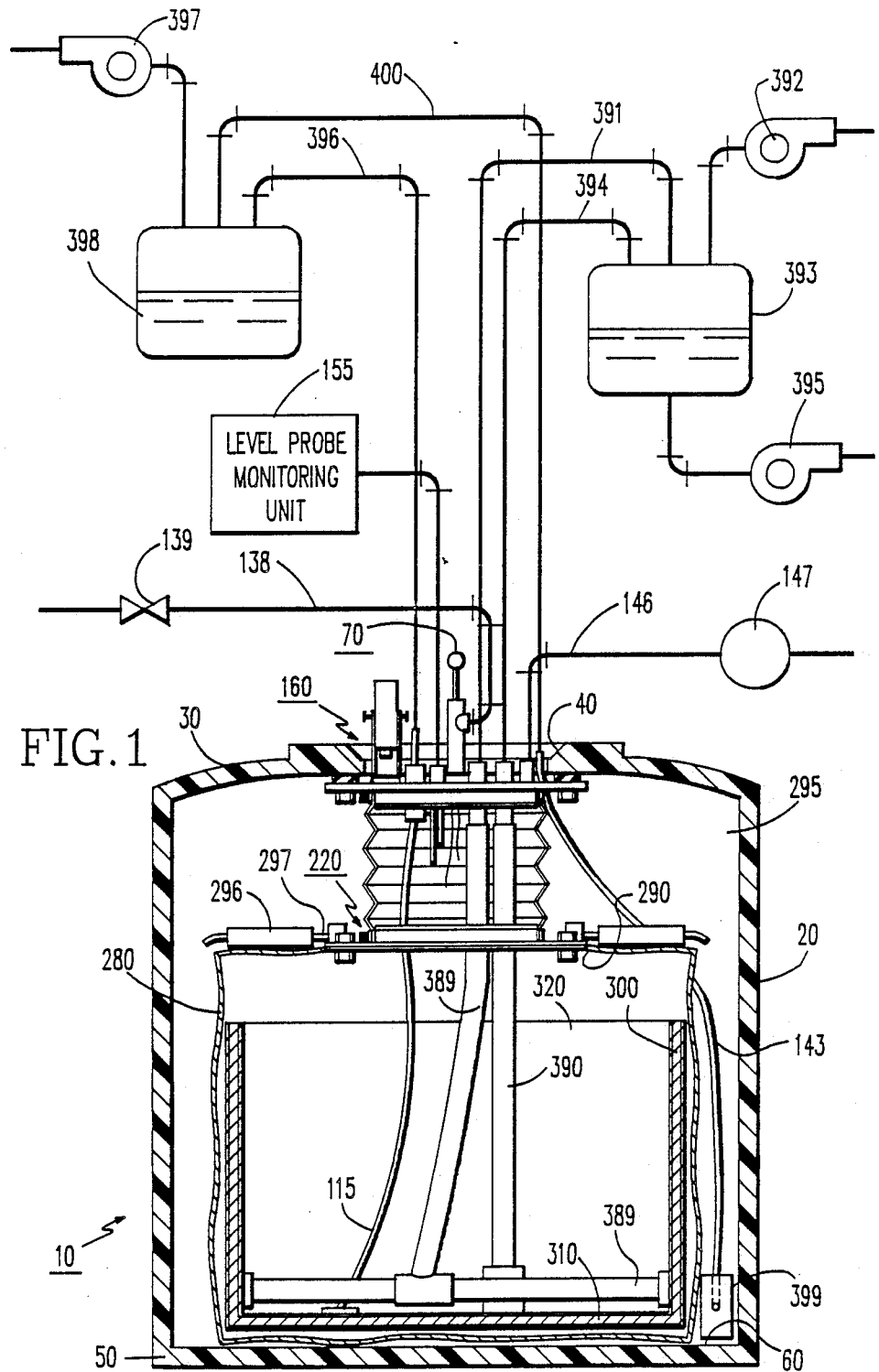
FIG. 1 is a view in partial vertical section of a first embodiment of the invention, which includes an outer container surrounding a flexible filter and collapsible membrane combination.

Referring to FIG. 1, there is illustrated an apparatus 10 for removing fluid (not shown) from a fluid-containing composition such as radioactive waste slurry solids and for storing the composition after the fluid is removed. The waste slurry solids may be of the type commonly produced in nuclear-related activities, such as aqueous waste slurry solids from a nuclear reactor power plant ion-exchange resin bed. In this regard, apparatus 10 comprises a shell or outer container 20 which provides primary containment for the slurry solids when the slurry solids are disposed therein. Outer container 20 may be formed from any suitable non-porous material such as high-density, cross-linked polyethylene so that gas, liquid and/or the solids cannot pass through outer container 20 and so that outer container 20 substantially protects nearby ground water and the biosphere surrounding apparatus 10 from being contaminated by the radioactive waste slurry solids. Outer container 20 may be generally cylindrical and has a first end 30 that has an opening 40 therethrough. Opening 40 may be shaped for matingly receiving a removable cap assembly 45 (see FIGS. 5 and 6) which is capable of being sealingly attached to opening 40 for sealingly closing opening 40. As illustrated in FIG. 1, outer container 20 also has a closed second end 50 opposite first end 30. Second end 50 has a top surface 60 thereon facing first end 30. Outer container 20 may be approximately 6.5 feet in length and approximately 6 feet in diameter, although a wide range of sizes and shapes is contemplated.

Figure 2:
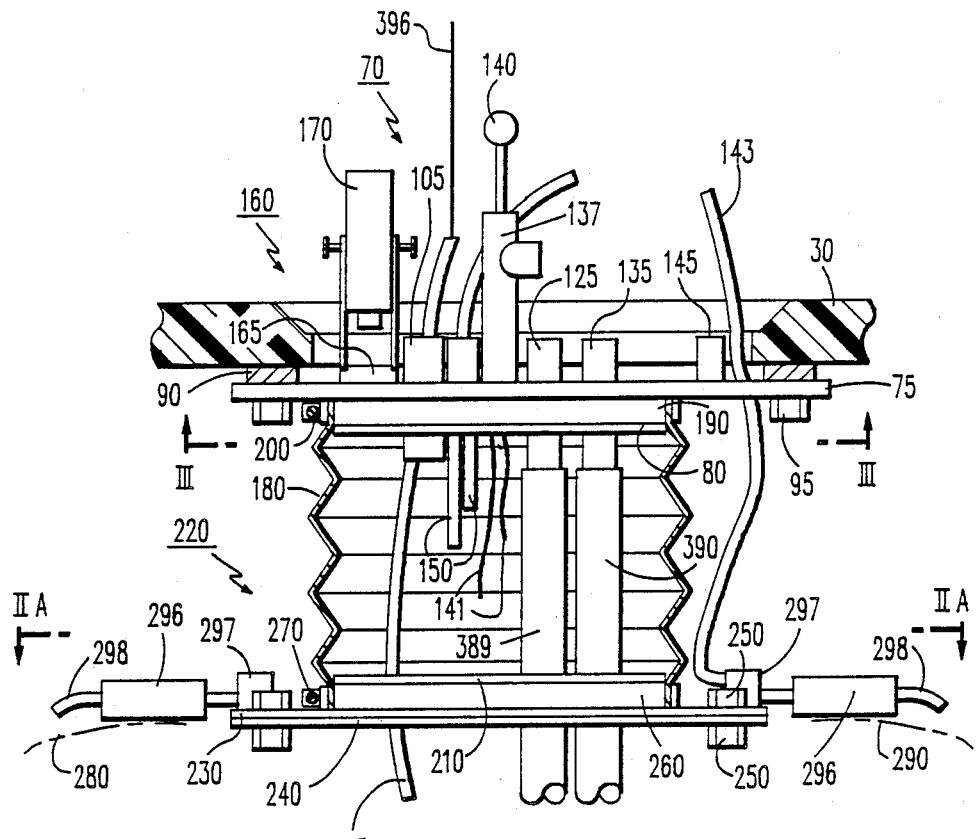
FIG. 2 is a view of an upper fill plate and a lower fill plate connected therebetween by an accordionlike bellows.
Figure 3:
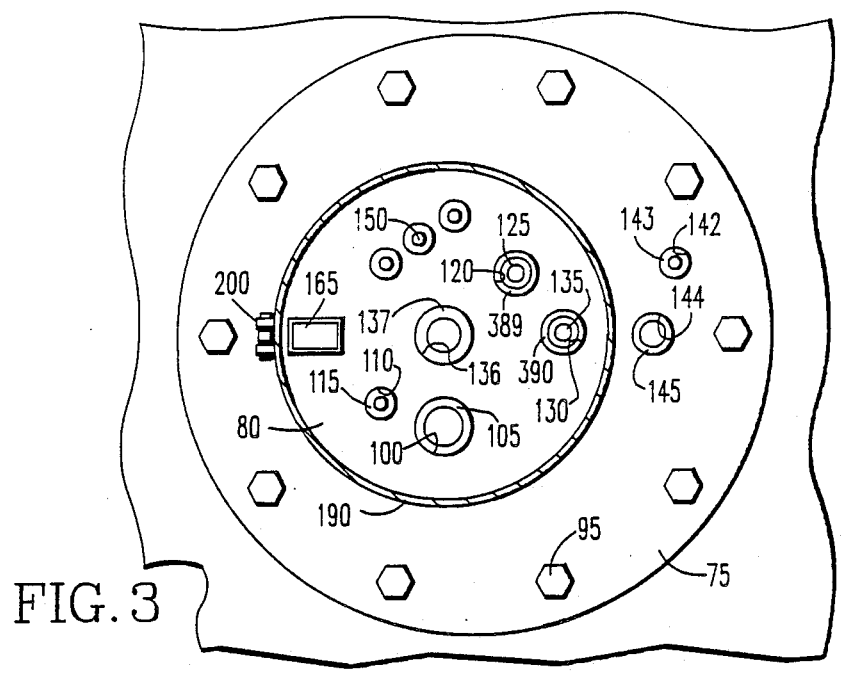
FIG. 3 is a bottom view of the upper fill plate taken along section III—III of FIG. 2.

As best seen in FIGS. 1, 2 and 3, an upper fill plate 70, which may be generally circular or disk-shaped, is sealingly connected to first end 30 or cap assembly 45 of outer container 20. Upper fill plate 70 is mounted in outer container 20 and across opening 40 for covering opening 40 and may be fabricated from any suitable non-porous material, such as carbon steel. Upper fill plate 70 may comprise a generally circular base 75 having a first flange 80, which may be generally circular, outwardly extending from base 75 in the direction of second end 50 of outer container 20. Interposed between upper fill plate 70 and first end 30 of outer container 20 may be an annular seal or gasket 90. As will be understood from the description hereinbelow, gasket 90 is preferably sandwiched between first end 30 and upper fill plate 70 so that first end 30 and upper fill plate 70 are in a substantially seal-tight relation. A plurality of screws 95 extend through upper fill plate 70 and gasket 90 and engage cap assembly 45 or first end 30 to provide the necessary clamping force on gasket 90 so that first end 30 and upper fill plate 70 remain in a substantially seal-tight relation. Upper fill plate 70 has a first aperture 100 therethrough, which may be generally circular, for receiving a generally tubular fill connection 105 through which apparatus 10 is filled with slurry solids. Fill connection 105 is secured in first aperture 100. Upper fill plate 70 also has a second aperture 110 therethrough, which may be generally circular, for receiving a generally tubular first conduit 115. First conduit 115 may be a flexible, heavy-walled rubber tube to resist rupture by high vacuum or by high pressure therein. Upper fill plate 70 also has formed therethrough a third aperture 120 and a fourth aperture 130. Third aperture 120 and fourth aperture 130 also may be generally circular. Extending through third aperture 120 and fourth aperture 130 and secured therein are a generally tubular first dewatering connection 125 and a generally tubular second dewatering connection 135, respectively, through which water is withdrawn from apparatus 10 as described more fully below. Upper fill plate 70 also includes on the inboard side of flange 80 a first vent opening 136, which may be generally circular. First vent opening 136 may be provided with a generally tubular first vent connection 137 secured therein for venting the inside of membrane 280 to the ambient environment external to outer container 20. First vent connection 137 is in turn connected to a removable first vent line 138 equipped with a first vent valve 139 for controllably venting the inside of membrane 280 (see FIG. 1). First vent connection 137 may also include means, such as temperature probe 140, for measuring the temperature of slurry solids in apparatus 10. Moreover, temperature probe 140 has means, such as at least one heat conducting wire 141, for converting the temperature to an electrical resistance detectable by temperature probe 140. It will be understood that wire 141 extends from temperature probe 140 a predetermined distance into outer container 20 so that the temperature of the slurry solids in outer container 20 can be adequately measured. Temperature probe 140 may be electrically connected to a temperature monitoring unit (not shown) for conveniently displaying the temperature of the slurry solids. The temperature monitoring and measuring capability of the invention are important because the temperature monitoring and measuring capability provide means for early identification of exothermic reactions in the dewatered slurry solids, thereby increasing operator and equipment safety. It is expected that a rise in temperature of the slurry solids during operation of less than or equal to approximately 20 degrees Fahrenheit would be within the expected safety range. Moreover, upper fill plate 70 has a fifth aperture 142 therethrough, which may be generally circular, for receiving a generally tubular second conduit 143. For reasons more fully described hereinbelow, also formed through upper fill plate 70 on the outboard side of flange 80 is a second vent opening 144, which may be generally circular. Second vent opening 144 may be provided with a generally tubular second vent connection 145 secured therein for venting the inside of outer container 20 to the ambient environment external to outer container 20. Second vent connection 145 is in turn connected to a removable second vent line 146 equipped with a second vent valve 147 for controllably venting the inside of outer container 20. First vent valve 139 and second vent valve 147 are capable of opening and closing first vent opening 136 and second vent opening 144, respectively, so that the atmosphere within membrane 280 and outer container 20, respectively, is controllably vented.

As shown in FIGS. 1 and 2, extending through and outwardly from upper fill plate 70 and into outer container 20 is at least one level probe 150 electronically and/or mechanically connected to a level probe monitoring unit 155 for monitoring the height or level of the slurry solids within membrane 280. Level probe monitoring unit 155, which is sealingly disposed through upper fill plate 70, is capable of issuing an alarm if outer container 20 approaches an overfill condition. Level probe 150 may be any suitable level probe such as that manufactured by B/W Controls, Incorporated located in Clawson, Mich. It is important that apparatus 10 be provided with level control and monitoring for the two reasons stated immediately hereinafter. First, level control and monitoring ensure that the slurry solids volume in outer container 20 is maintained at an optimum level for the dewatering process. Secondly, level control and monitoring ensure that any excessively full condition is alarmed and the container isolated before an overfill condition occurs.

Still referring to FIGS. 1 and 2, connected to upper fill plate 70 may be viewing means 160 for viewing the interior of apparatus 10. Viewing means 160 comprises an observation window 165 positioned in upper fill plate 70, which observation window 165 is a transparent material, such as commercially available plexiglass, for observing the interior of apparatus 10. Window 165, which may be generally rectangular, is preferably capable of resisting breakage under impact so that the containment capability of outer container 20 is not breached during processing by inadvertent impact of an object on and by breakage of window 165. Viewing means 160 may also comprise a camera 170 electronically connected to a remote viewing screen (not shown) for remotely viewing the interior of apparatus 10 through window 165. As shown in FIGS. 1 and 2, camera 170 may be suitably mounted on upper fill plate 70.

Referring again to FIGS. 1 and 2, a collapsible bellows 180 comprising a plurality of flexible pleats is connected at a first end thereof to first flange 80 by a first band 190. First band 190, which may be metal, is capable of bendably surrounding first flange 80 and the first end of bellows 180 for attaching the first end of bellows 180 to first flange 80. First band 190 has first fastener means, such as a first screw clamp 200, for fastening and tightening first band 190 around first flange 80 and around the first end of bellows 180. It will be appreciated that the first end of bellows 180 is interposed between first band 190 and first flange 80. When fully extended, bellows 180 may obtain a length of approximately 18 inches. When fully collapsed, bellows 180 may obtain a length of approximately 3 inches.

As illustrated in FIGS. 1 and 2, a second end of bellows 180 is connected to a second flange 210 belonging to a lower fill plate generally referred to as 220. Lower fill plate 220, which is positioned generally coaxially below upper fill plate 70, comprises a substantially planer first clamp plate 230 and a substantially planer second clamp plate 240. Second clamp plate 240, which may be generally circular, is disposed opposite and adjacent to first clamp plate 230, which first clamp plate 230 is disposed nearer upper fill plate 70. First clamp plate 230, which also may be circular, and second clamp plate 240 are capable of being intimately joined by a plurality of removable bolts 250 extending therethrough.

As best seen in FIG. 2, second flange 210, which may be circular, outwardly extends from first clamp plate 230 in the direction of first flange 80. A second band 260, which may be metal, is capable of bendably surrounding second flange 210 and the second end of bellows 180 for attaching the second end of bellows 180 to second flange 210. Second band 260 has second fastener means, such as a second screw clamp 270, for fastening and tightening second band 260 around second flange 210 and around the second end of bellows 180. It will be appreciated that the second end of bellows 180 is interposed between second band 260 and second flange 210. Second flange 210, first clamp plate 230 and second clamp plate 240 have a plate opening therethrough for passage of first conduit 115 and dewatering hoses 389 and 390.

As shown in FIGS. 1 and 2, also disposed in outer container 20 is compression means for compressing the water from the slurry solids, which compression means may be a bag-shaped, non-porous and substantially collapsible membrane 280 having an open end 290 tightly clamped between first clamp plate 230 and second clamp plate 240. Open end 290 is clamped between first clamp plate 230 and second clamp plate 240 by bolts 250. Open end 290 is sealingly clamped between first clamp plate 230 and second clamp plate 240 such that a relatively small hole (not shown) in open end 290 is coaxially aligned with bellows 180 for passage of the aqueous slurry solids from bellows 180, through the hole in open end 290 and into collapsible membrane 280. The configuration of bellows 180 and lower fill plate 220 provides for unrestricted movement of open end 290 as the slurry solids fill membrane 280 and is dewatered. It will be appreciated that when membrane 280 is attached to lower fill plate 220 in this manner, the inside of membrane 280 including the slurry solids therein is segregated from the inside of outer container 20. Thus, membrane 280, which substantially surrounds the slurry solids, is capable of providing secondary containment for the slurry solids while outer container 20 is capable of providing primary containment for the slurry solids. As described in more detail hereinbelow, collapsible membrane 280 is also capable of collapsing about the slurry solids so that entrained water is compressed from the slurry solids. Membrane 280 is preferably made from a non-porous material such as polyethylene so that membrane 280 is gas-tight and liquid-tight for protecting nearby ground water and the biosphere surrounding apparatus 10 from contamination by the radioactive waste slurry solids and for efficiently compressing the slurry solids. It will be understood that membrane 280 is substantially continuous except for the relatively small hole in open end 290. This is important because the continuity of membrane 280 allows membrane 280 to be less prone to leaks and to be compressed substantially from all sides. Moreover, the continuity of membrane 280 allows it to function as an independent secondary containment, as stated above. Therefore, it will be appreciated that membrane 280 serves two functions. First, membrane 280 functions as a secondary containment for the slurry solids. Secondly, membrane 280 functions as means for compressing the slurry solids so that entrained water is removed from the slurry solids as described in more detail below.

Figure 1A:
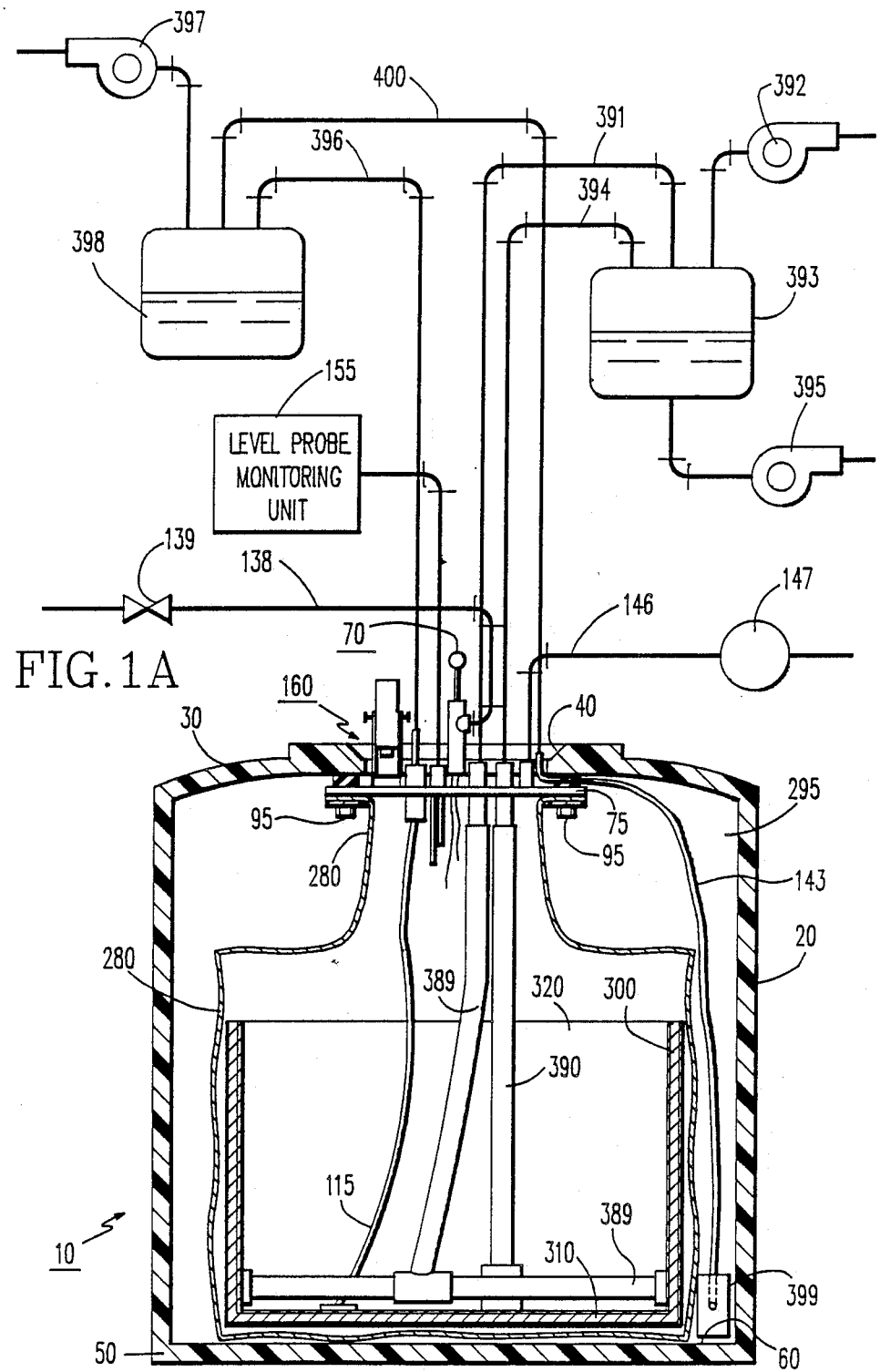
FIG. 1A shows another embodiment of the membrane.

FIG. 1A illustrates another embodiment of membrane 280. In this embodiment of membrane 280, bellows 180, lower fill plate 220, sleeves 296, couplings 297 and stays 298 are omitted for ease of construction of apparatus 10 and to reduce the number of parts connected to apparatus 10. As shown in FIG. 1A, upper fill plate 70 is modified to accommodate this embodiment of membrane 20.

As shown in FIG. 1, outer container 20 and membrane 280 define an annular space 295 therebetween. It will be understood that second vent opening 144 which is disposed on the outboard side of flange 80 connects space 295 with the ambient environment external to outer container 20. In this regard, second vent opening 144 performs three distinct functions. First, second vent opening 144 assists in inflating membrane 280. That is, a relatively small negative pressure, such as approximately negative 1 pound per square inch gauge, may be produced in space 295 through second vent opening 144 prior to transferring the slurry solids into membrane 280. With membrane 280 at positive atmospheric pressure on the inside (i.e., first vent opening 136 open) and negative pressure on the outside (i.e., vacuum applied to second vent opening 144), membrane 280 will tend to inflate for accepting more slurry solids. Secondly, second vent opening 144 assists in deflating or collapsing membrane 280. In this regard, when first opening 136 is closed and filters 300 and 310 (see FIG. 1) are under suction (as described more fully below) and when second vent opening 144 is open, membrane 280 will be at a less than atmospheric pressure on the inside thereof and atmospheric pressure on the outside thereof. Thus, membrane 280 will tend to collapse about the slurry solids for compressing the slurry solids. Thirdly, second vent opening 144 is used to fill space 295 with backfill material, as described in more detail hereinafter.

Figure 2A:
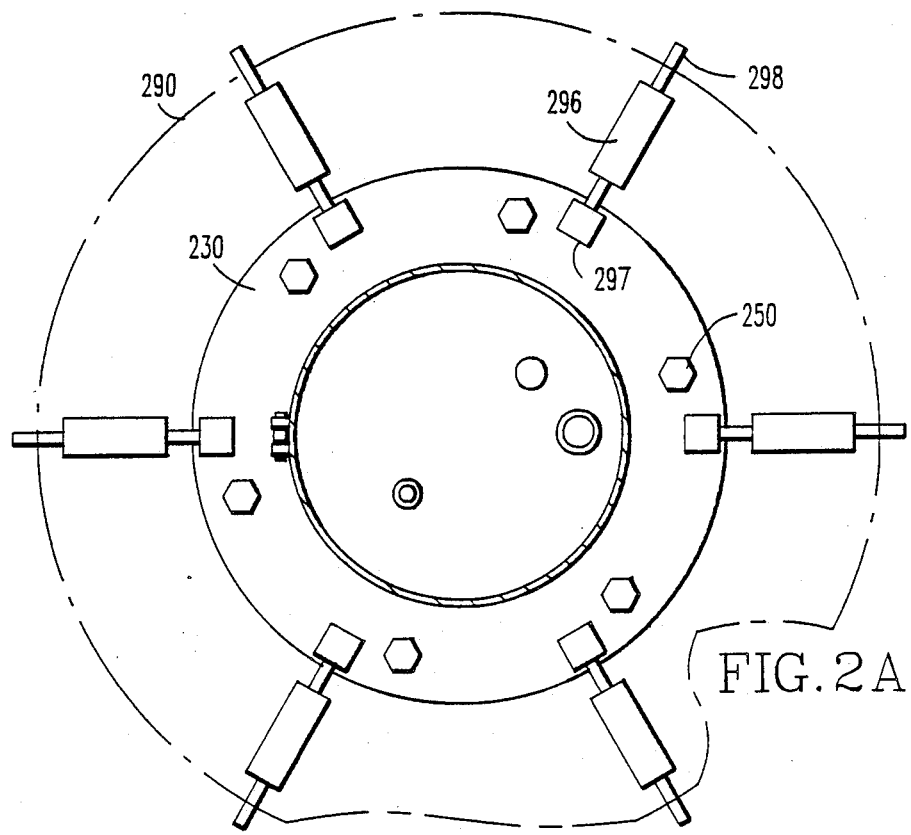
FIG. 2A shows a top view of the lower fill plate.

Referring again to FIGS. 1, 2 and 2A, integrally attached to the outside surface of open end 290 are a plurality of sleeves 296 disposed near bolts 250 and radiating from the hole in open end 290 which belongs to membrane 280. Also attached to first clamp plate 230 and surrounding the hole in open end 290 are a plurality of couplings 297 for attaching a plurality of elongated ribs or stays 298 to first clamp plate 230, which stay 298 extend through sleeves 296. Sleeves 296, couplings 297 and stays 298 radiate from the hole in open end 290 in a 360 degree orientation like spokes in a wheel. However, although any two diametrically opposed stays 298, associated couplings 297, and associated sleeves 296 are necessarily arranged in an approximate 180 degree relation, each stay 298, associated coupling 297, and associated sleeve 296 is necessarily off-set from the vertical centerline of membrane 280. That is, an axis along the 180 degree relation mentioned above would not pass through the vertical centerline of membrane 280. Therefore, because each stay 298 and associated sleeve 296 is necessarily off-set from the vertical centerline of membrane 280, each stay 298 is fabricated so that its length is different by a predetermined amount from the length of the opposing stay which is at a 180 degree relation to it. The end of each stay 298 which is furthest from the hole in open end 290 terminates to within approximately one-half inch of outer container 20. The proximity of this end of each stay 298, to outer container 20 in addition to the differing lengths of stays 298 assist in maintaining membrane 280 centered within outer container 20. Moreover, 296 and stays 298 also maintain the top of membrane 280 substantially planer for facilitating filling the top corners of outer container 20 with slurry solids.

Returning to FIG. 1, filter means, which may be a plurality of porous filters, is disposed in membrane 280 toward the perimeter of membrane 280 for filtering the water compressed from the slurry solids. These filters may comprise a vertical first filter 300 of relatively large surface area and a horizontal second filter 310. First filter 300 may be a hollow cylinder. Second filter 310 may be generally flat and may extend substantially across the bottom of first filter 300. Thus, first filter 300 and second filter 310 define a generally cylindrical chamber 320 open at one end for receiving substantially all of the slurry solids therein. First filter 300 and second filter 310 may be contiguous, if desired. By way of example only, first filter 300 may be approximately 5 feet high and approximately 6 feet in inside diameter and second filter 310 may be approximately 6 feet in diameter. As described in more detail hereinbelow, first filter 300 and second filter 310 are self-supporting and flexible for deflecting without impairing the function of filters 300 and 310.

Figure 4A:
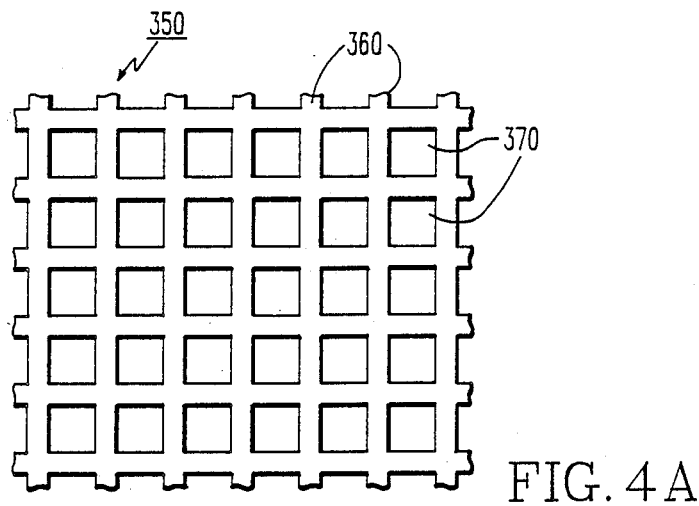
FIG. 4A illustrates the structure of a lattice disposed in the flexible filter.
Figure 4:
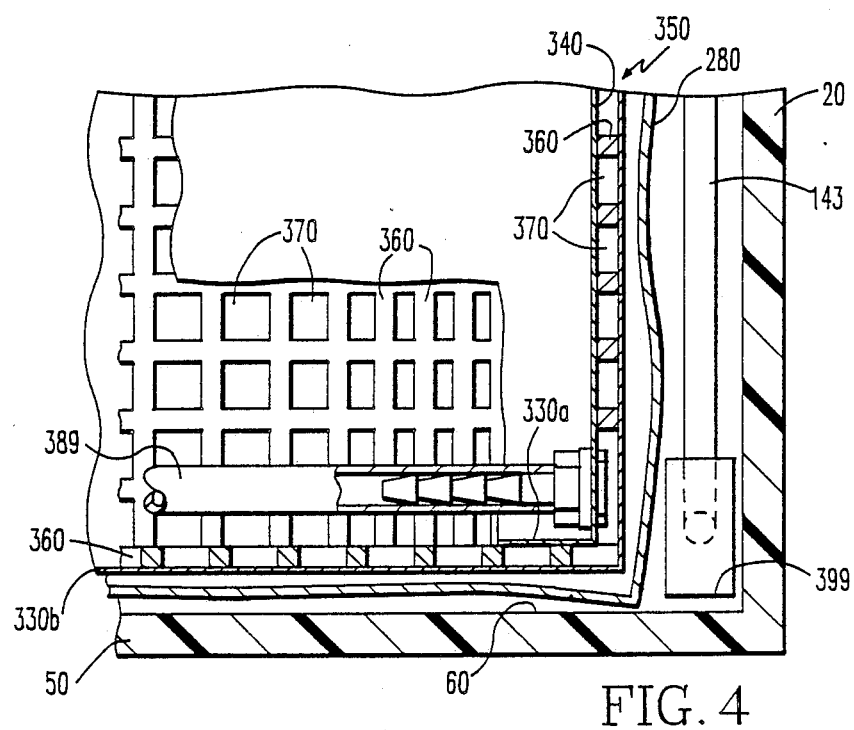
FIG. 4 illustrates in vertical section the flexible filter and collapsible membrane combination.

Turning now to FIGS. 4 and 4A, there is shown the configuration of vertical first filter 300 and horizontal second filter 310 that allow these filters to be self-supporting and flexible. It is important that first filter 300 and second filter 310 be self-supporting so that use of supporting structure to support filters 300 and 310 in outer container 20 is avoided. Avoidance of supporting structure within outer container 20 conserves space within outer container 20 so that relatively more slurry solids may be placed into outer container 20. It is also important that filters 300 and 310 be flexible so that these filters are capable of deflecting and flexibly conforming to the volume of slurry transferred into chamber 320 and so that filters 300 and 310 are capable of deflecting to avoid damage to membrane 280. As described hereinafter, filters 300 and 310 are substantially porous for filtering the water from the slurry solids. However, filters 300 and 310 are not so porous as to allow the slurry solids to pass through them. In this regard, each filter 300 and 310 comprises two oppositely disposed porous fiber sheets 330a and 330b, which may be porous polyester, defining a passageway 340 therebetween. As shown in FIGS. 4 and 4A, positioned in passageway 340 is a drainage grid, generally referred to as 350, comprising a flexible lattice 360, which may be polyethylene. Lattice 360 defines a plurality of holes 370 therethrough for passage of the water and for providing strength to lattice 360. Drainage grid 350 and sheet 330a and drainage grid 350 and sheet 330b define a pair of flow paths 385 for simultaneous passage of the water along flow paths 385 and through holes 370. Lattice 360 enables first filter 300 and second filter 310 to be both self-supporting and flexible. In this regard, when filters 300 and 310 are deformed by external compressive or expansive loads or forces, fiber sheets 330a and 330b and lattice 360 flex or deform substantially, thus allowing filters 300 and 310 to be substantially flexible. On the other hand, when filters 300 and 310 are not under a compressive or expansive load, lattice 360 supplies sufficient rigidity to filters 300 and 310 to allow filters 300 and 310 to be substantially self-supporting. As described more fully hereinbelow, filters 300 and 310 will undergo compressive loading when membrane 280, shown in FIG. 4 on the outboard side of sheet 330b, collapses about the waste solids and filters 300 and 310. Conversely, filters 300 and 310 will undergo expansive loading when the slurry solids disposed in membrane 280 on the in-board side of sheet 330a push outwardly as apparatus 10 is filled with slurry solids. Therefore, it will be appreciated that filters 300 and 310 will expand outwardly when the expansive loading or expansive force exerted by the slurry solids therein on filters 300 and 310 is greater than any compressive loading or compressive force exerted by membrane 280 on filters 300 and 310. Conversely, it will be appreciated that filters 300 and 310 will compress or deflect inwardly when the expansive loading or expansive force exerted by the slurry solids therein on filters 300 and 310 is less than the compressive loading or compressive force exerted by membrane 280 on filters 300 and 310. Moreover, it will also be appreciated that filters 300 and 310 Will support themselves and neither expand nor compress when substantially no external force is acting upon them or when the expansive and the compressive forces are substantially equal. Thus, drainage grid 350 assists in draining the water through passageway 340 and provides support and flexibility to filters 300 and 310. Of course it will be understood that sheet 330b may be deleted such that drainage grid 350 is interposed between sheet 300a and membrane 280.

Referring to FIGS. 1, 2 and 4, a plurality of tubular dewatering hoses, such as first dewatering hose 389 and second dewatering hose 390, are integrally connected at one end thereof to filters 300 and 310, respectively, for applying a vacuum to filters 300 and 310 so that water is withdrawn from the slurry solids disposed in membrane 280. Dewatering hoses 389 and 390 may be flexible heavy-walled rubber tubes to resist rupture by high vacuum or by high pressure therein. Dewatering hoses 389 and 390 are placed in fluid communication with passageway 340 for withdrawing water from passageway 340 through flow path 385. It will be appreciated that when the water is filtered from the slurry solids and through sheets 330a and 330b, it will flow into passageway 340 and flow path 385 due to the suction action of vacuum means connected to dewatering hoses 389 and 390, as described immediately below. Dewatering hoses 389 and 390 each also has the other end thereof connected to third aperture 120 and fourth aperture 130, respectively, in upper fill plate 70. Third aperture 120 is in turn connected to first dewatering connection 125. In order to apply a vacuum to first dewatering hose 389, first dewatering connection 125 is connected to a corresponding first vacuum line 391 which is in turn connected to an associated first vacuum pump 392 via first vacuum tank 393 for producing a vacuum in the corresponding dewatering hose 389 and associated passageway 340. Similarly, in order to apply a vacuum to second dewatering hose 390, second dewatering connection 135 is connected to a corresponding second vacuum line 394 which is in turn connected to first vacuum pump 392 via first vacuum tank 393 for producing a vacuum in second dewatering hose 390 and associated passageway 340. First vacuum pump 392 may be a centrifugal pump capable of suctioning air from first vacuum tank 393 and thus producing a vacuum in first vacuum tank 393. Moreover, connected to first vacuum tank 393 may be a second vacuum pump 395 for removing water from first vacuum tank 393 that is suctioned into first vacuum tank 393. Second vacuum pump 395 may be a double diaphragm positive displacement pump capable of suctioning air and/or liquid from first vacuum tank 393. By way of example only, first vacuum tank 393 may have a capacity of 55 gallons.

Still referring to FIGS. 1, 2, and 4, verification means, such as first conduit 115 and second conduit 143 are used, respectively, to verify that the dewatering process is complete and to verify that membrane 280 has not been inadvertently breached. First conduit 115 extends from upper fill plate 70 through the open end of membrane 280 to second filter 310 and has one end in fluid communication with passageway 340 in second filter 310 for withdrawing water from second filter 310. First conduit 115 has the other end thereof routed through second aperture 110 in upper fill plate 70. Second aperture 110 is connected to a third vacuum line 396 which is in turn connected to a third vacuum pump 397 via a second vacuum tank 398 for producing a vacuum in first conduit 115 and passageway 340 in second filter 310. The verification means also includes second conduit 143 extending from the outboard side of first flange 80 to near top surface 60 belonging to second end 50 of outer container 20. In addition, second conduit 143 is disposed through annular space 295 defined by outer container 20 and membrane 280. Therefore, second conduit 143 extends through space 295 from upper fill plate 70 to top surface 60 of outer container 20 and is positioned external to membrane 280. Second conduit 143 is capable of withdrawing water from top surface 60 of closed end 50 in the event that membrane 280 is inadvertently breached, which breach would allow water to flow through the breach to top surface 60. Second conduit 143 has one end thereof sealingly terminating inside a filter pouch 399 disposed on or near top surface 60 and has the other end thereof routed through fifth aperture 142 in upper fill plate 70. Filter pouch 399 may be made of the same material as fiber sheets 330a and 330b for filtering water therethrough. Moreover, filter pouch 399 sealingly encloses the end of second conduit 143 such that any dewatered solids passing through any breach in membrane 280 can not enter and plug second conduit 143. Fifth aperture 142 is connected to a fourth vacuum line 400 which is in turn connected to third vacuum pump 397 via second vacuum tank 398 for producing a vacuum in second conduit 143 such that water is withdrawn from near top surface 60 if membrane 280 is breached. Thus, the presence of water in second conduit 143 would indicate that membrane 280 has been breached. Third vacuum pump 397 may be capable of suctioning air and/or water from second vacuum tank 398 for producing a vacuum in second vacuum tank 398. By way of example only, second vacuum tank 398 may have a capacity of 5 gallons. It will be noted that first vent line 138, second conduit 143, second vent line 146, first vacuum line 391, second vacuum line 394, third vacuum line 396, and fourth vacuum line 400 may each be a flexible heavy-walled rubber tube to resist rupture by high vacuum or high pressure therein.

Figure 5:
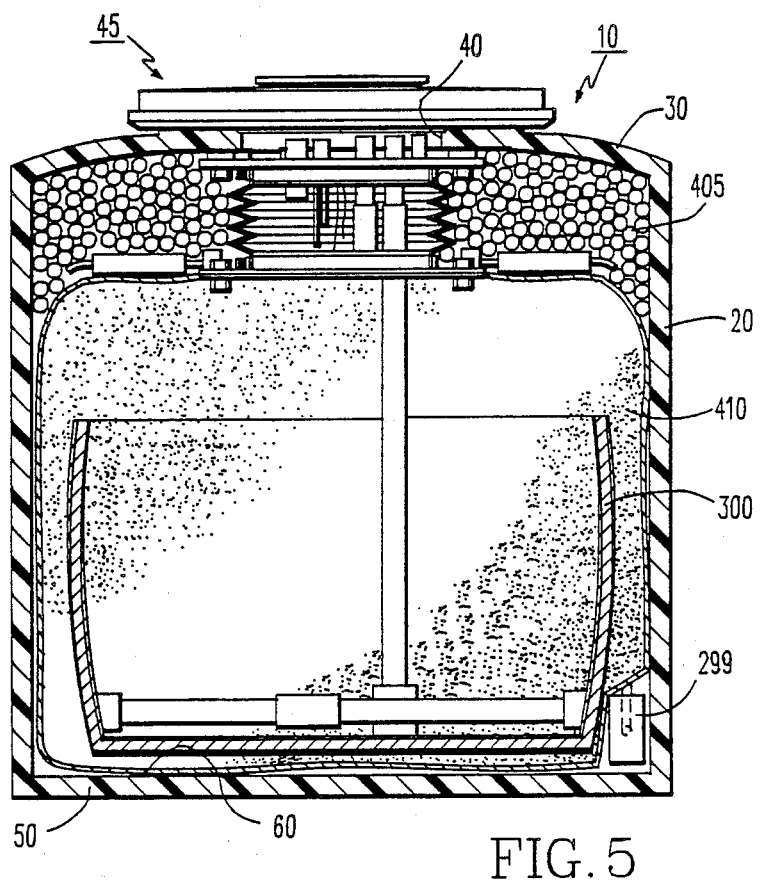
FIG. 5 is a view in partial vertical section of the first embodiment of the invention and illustrates the location of backfill material interposed between the outer container and the collapsible membrane.

Referring to FIG. 5, there is illustrated apparatus 10 having backfill material 405 poured through second vent opening 144 and into space 295 for internally supporting outer container 20 and for further compressing or compacting the dewatered slurry solids 410 (i.e., separated-out solids) in membrane 280 and chamber 320. Backfill material 405 may be a settable fluid, cement grout or the like, or a plurality of relatively small inviscid or non-viscous particulates with good flow characteristics such as relatively small metal spheres or dry sand.

Figure 6:
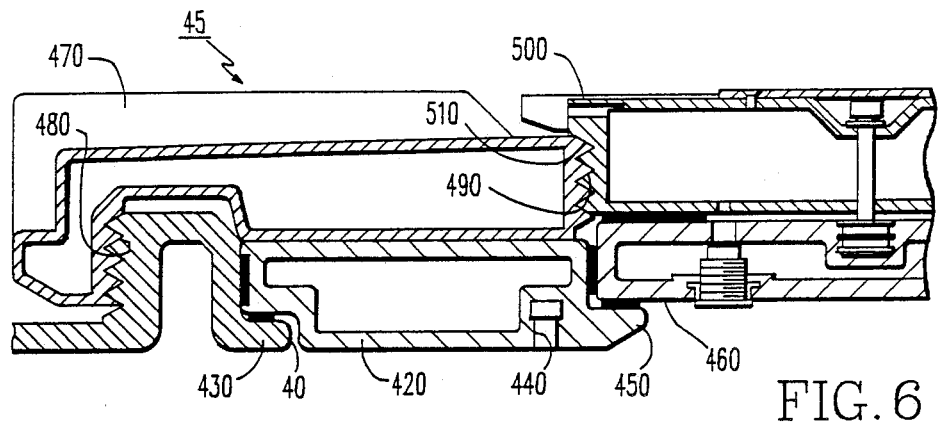
FIG. 6 shows a cap assembly for sealingly closing or capping the outer container.

FIG. 6 shows the structural detail of cap assembly 45 referred to above. As described hereinabove, cap assembly 45 is configured for sealingly closing opening 40 in outer container 20. In this regard, cap assembly 45 comprises a generally annular fill port base 420 reposing on a ledge 430 and circumscribing hole 40. Fill port base 420 may be polyethelene and substantially hollow for reducing the weight of fill port base 420 so that fill port base 420 is easily manually liftable by the operator of apparatus 10. Fill port base 420 may also include a plurality of screw holes 440 therein for threadably receiving the associated screws 95 belonging to upper fill plate 70. Interposed between ledge 430 and fill port base 420 may be a seal for maintaining outer container 20 and fill port base 420 in a substantially seal-tight relation. Fill port base 420 further includes a lip 450, for reasons provided hereinbelow, circumscribing the inner circumference of annular fill port base 420. Reposing on lip 450 is a generally disk-shaped fill port plug 460 for covering opening 40. Fill port plug 460 may be polyethylene and substantially hollow for reducing the weight of fill port plug 460 so that fill port plug 460 is easily manually liftable by the operator. Interposed between lip 450 and fill port plug 460 may be a seal for maintaining fill port base 420 and fill port plug 460 in a substantially sealtight relation.

Still referring to FIG. 6, cap assembly 45 also includes a generally annular, ring-shaped fill port hold-down member 470 for securing cap assembly 45 to outer container 20. Hold-down member 470 is mounted atop fill port base 420 and is secured to outer container 20 by any suitable means, such as by outer threads 480 formed in hold-down member 470 for threadably engaging threads formed in outer container 20. Hold-down member 470 further includes inner threads 490 circumscribing the inner circumference of annular hold-down member 470 for reasons provided hereinbelow. Hold-down member 470 may be polyethylene and substantially hollow so that hold-down member 470 is easily manually liftable by the operator. Mounted atop fill port plug 460 is a generally disk-shaped fill port closure member 500 for maintaining fill port plug 460 in hole 40 by bearing downwardly against fill port plug 460. Surrounding the circumference of closure member 500 are threads 510 for threadably engaging threads 490. Closure member 500 may be polyethylene and substantially hollow so that closure member 500 is easily manually liftable by the operator. Thus, it will be understood that cap assembly 45 is capable of sealingly closing or capping apparatus 10 for burial.

Second Embodiment of the Invention

Referring to FIG. 7, there is illustrated a second embodiment of the invention. The second embodiment of the invention is similar to the first embodiment of the invention, except that outer container 20 does not have collapsible membrane 280 disposed therein. When membrane 280 is not disposed in outer container 280, then outer container 20 should be flexible for serving the same function as membrane 280. That is, outer container 20 should be flexible for compressing the slurry solids so that entrained water is removed from the slurry solids. In this regard, outer container 20 will collapse for compressing the slurry solids when sufficient vacuum is applied to the inside of outer container 20 via dewatering hoses 389 and 390 connected to filters 300 and 310. It will be understood that in this second embodiment of the invention first vent opening 136 is sealingly capped or absent. When first vent opening 136 is capped or absent and when filters 300 and 310 are under sufficient suction, outer container 20 will be at a negative pressure on the inside thereof and positive atmospheric pressure on the outside thereof. Outer container 20 will then tend to collapse about the slurry solids for compressing the slurry solids. Thus will outer container 20 behave as a collapsible membrane for compressing the slurry solids therein. However, when the suction is removed and second vent opening 144 is opened to atmospheric pressure, outer container 20 will tend to recover its original shape for accepting more slurry. Outer container 20 will tend to recover its original shape because the pressure inside outer container 20 will become substantially equal to the atmospheric pressure surrounding outer container 20. It will also be understood that because membrane 280 is no longer disposed in outer container 20, lower fill plate 220, bellows 180, and the appurtenances (e.g., stays 297) associated with membrane 280 are no longer needed. Therefore, lower fill plate 220, bellows 180, and associated appurtenances are absent from the second embodiment of the invention. By way of example only, in the second embodiment of the invention, outer container 20 may be flexible polyethylene approximately one-half inch to approximately one inch in thickness. Alternatively, outer container 20 may be vinyl approximately one-fourth inch to approximately one-half inch in thickness.

Third Embodiment of the Invention

Figure 8:
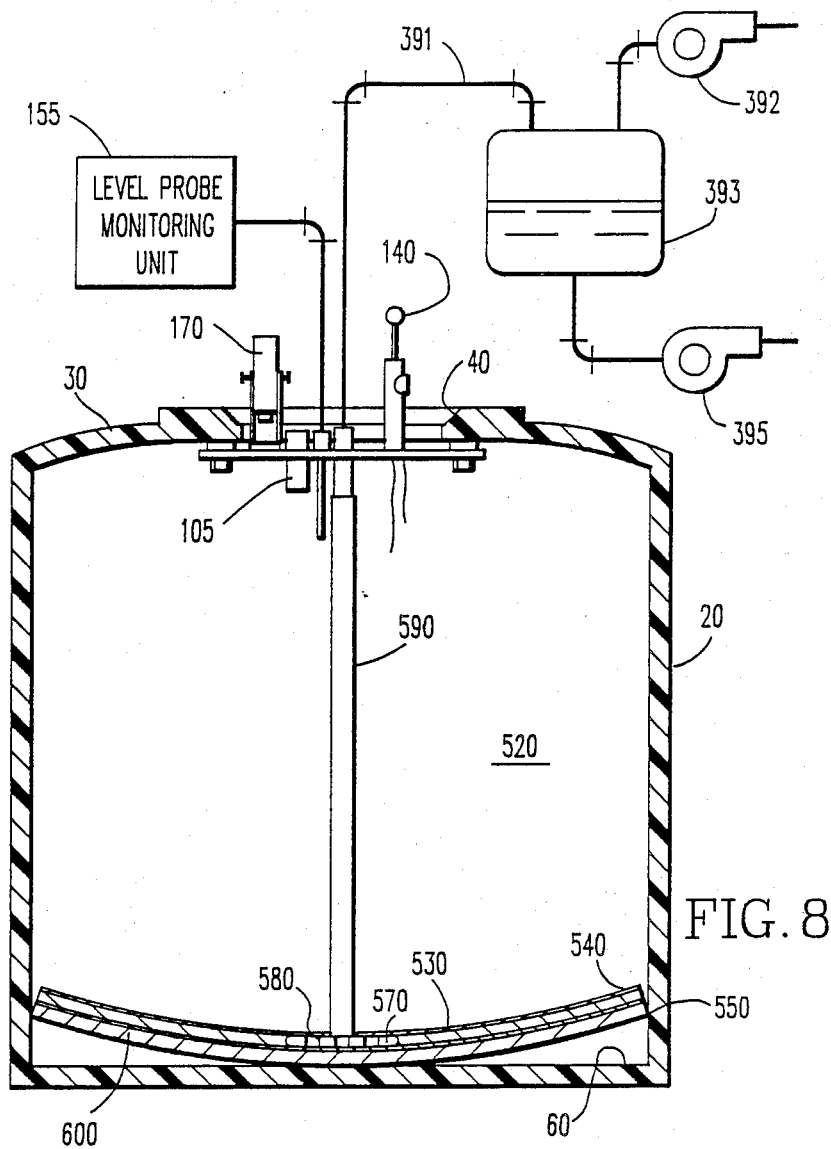
FIG. 8 shows a third embodiment of the invention.
Figure 8A:
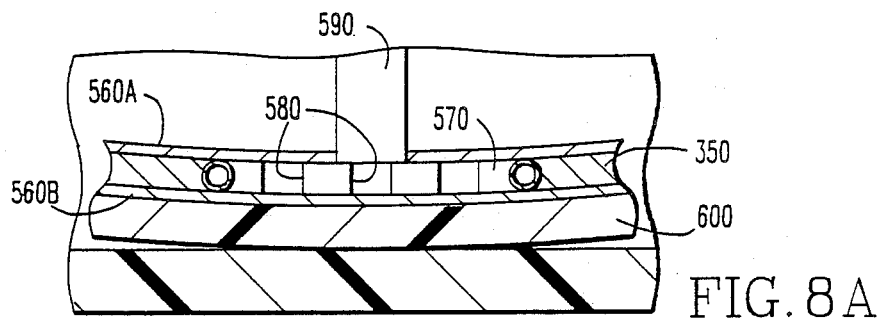

Referring to FIG. 8, there is shown a third embodiment of the invention comprising outer container 20 having an underdrain system, generally referred to as 520, connected thereto for removing entrained liquid from the slurry solids disposed in outer container 20. As described in more detail hereinafter, underdrain system 520 comprises a generally circular concave filter 530 disposed in outer container 20. The inwardly curving concave surface 540 of concave filter 530 faces first end 30 of outer container 20. Concave filter 530 may be generally circular and may be sized such that a marginal edge 550 belonging to concave filter 530 everywhere abuts the inside diametric surface of outer container 20. Marginal edge 545 of concave filter 530 preferably should sufficiently abut the inside surface of outer container 20 so that the slurry solids disposed in outer container 20 can not seep around marginal edge 550.

Referring to FIGS. 8 and 9, concave filter 530 comprises two oppositely disposed geotextile fabric sheets 560A and 560B. Fabric sheets 560A and 560B are porous for filtering the liquid from the slurry solids and may be fabricated from a geotextile material such as the material composing fiber sheets 330a and 330b (see FIG. 4). Disposed between fabric sheets 560A and 560B is at least one drainage grid 350 such as the drainage grid 350 illustrated in FIGS. 4 and 4A. Still referring to FIGS. 8 and 9, fabric sheets 560A and 560B may be either needle-punched fabric, bonded mat, or woven monofilament. The precise number of layers of fabric sheets 560A and 560B and types of material composing fabric sheets 560A and 560B should be selected to filter-out the slurry solids to be dewatered so that plugging of drainage grid 350 is prevented. Moreover, by way of example only, concave filter 530 may comprise two layers of drainage grid 350 and two layers each of fabric sheets 560A and 560B. The total thickness of all four layers of fabric sheets 560A and 560B may be approximately ¾ inch thick. Due to their inherent flexibility and high mechanical strength, underdrain system 520 is less susceptible to damage due to rough handling and transportation when compared to a current underdrain system using a bonded sand filter. Disposed between fabric sheets 560A and 560B near the lowest point of concave filter 530 is a hollow generally toroidal underdrain 570 for collecting the liquid filtered through fabric sheets 560A and 560B and drained through drainage grid 350. Underdrain 570 is perforated by a plurality of slots 580 therethrough for passage of liquid from drainage grid 350 and into underdrain 570. Moreover, underdrain 570 may be porous and/or further perforated for passage of liquid into underdrain 570. Underdrain 570 may have an outside diameter of approximately one foot.

Again referring to FIGS. 8 and 9, connected to underdrain 570 is a substantially vertical and generally tubular dewatering pipe 590 for suctioning liquid from the hollow portion of underdrain 570. Dewatering pipe 590 is in fluid communication with the hollow portion of underdrain 570 and extends from underdrain 570 to first dewatering connection 125 in upper fill plate 75. First dewatering connection 125 is connected to first vacuum line 391 which is in turn connected to first vacuum pump 392 via first vacuum tank 393. It will be appreciated that when first vacuum pump 392 applies suction to underdrain 570 via dewatering pipe 590, liquid interstitially entrained in the slurry solids will filter through fabric sheets 560A and 560B and flow downwardly along drainage gird 350 to underdrain 570. It will be understood that fabric sheets 560A and 560B serve at least two functions. First, fabric sheets 560A and 560B filter the liquid from the slurry solids. Secondly, fabric sheets 560A and 560B prevent the obstruction or plugging of drainage grid 350, slots 580, and the perforations that may be formed through underdrain 570. It will also be understood that the concave configuration of concave filter 530 assists in directing the liquid downwardly by action of gravity through drainage grid 350 so that the liquid will collect in underdrain 570 which is positioned near the lowest portion of concave filter 530.

As shown in FIGS. 8 and 9, concave filter 530 matingly reposes on a container bottom plate 610 which supports concave filter 530. Bottom plate 610 is attached, which may be by welding, to the inside diametric surface of outer container 20. Bottom plate 610 may comprise a generally circular concave stamped, molded or spun rigid head designed to provide sufficient slope for drainage of the liquid to underdrain 570. Alternatively, bottom plate 610 may be designed as a generally circular concave flexible diaphragm capable of deflecting under the weight of the slurry solids disposed on concave filter 530. By way of example only, a six foot diameter bottom plate 610 which deflects 3/8 inch will form a one percent slope or gradient according to the following mathematical expression:

$$S = 100 \times Defl/R$$
$$= 100 \times 0.375/36$$
$$\approx 1\%$$

where,
S=hydraulic gradient in percent,

Defl=deflection in inches, and
R=radius of bottom plate 610 in inches.
Therefore, by way of example only, using a typical transmissivity value of 5 gallons of liquid per minute per foot width of the drainage grid 350 per unit gradient for a single layer of drainage grid 350 placed on a one percent slope, the liquid flow at the perimeter of a one foot outside diameter underdrain 570 having an outside circumference of 3.14 feet will be as follows:

$$\begin{aligned} Q &= \theta \times W \times S \\ &= (5) \times (3.14) \times (0.01) \\ &= 0.16 \end{aligned}$$

where,
Q=flow in gallons per minute per layer of drainage grid 350,
$\theta$=hydraulic transmissivity in gallons per minute per foot width per unit gradient for a single layer of drainage grid 350,
W=outside circumference of underdrain 570 in feet Note that W is given by the formular 2 r, where r is the outside radius of underdrain 570, and
S=hydraulic transmissivity in gallons per minute per foot width of drainage grid 350 per unit gradient for a single layer of drainage gird 350.

Thus, it will be understood that the number of drainage grids 350 and the slope of bottom plate 610 may be increased, if desired, for achieving greater liquid flow to underdrain 570 so that waste processing efficiency is enhanced.

METHOD OF THE FIRST EMBODIMENT OF THE INVENTION

Waste processing includes transferring, through first aperture 100, the aqueous slurry solids into membrane 280. Second vent opening 144 is opened by opening second vent valve 147 belonging to second vent line 146 such that membrane 280 is exposed to the ambient atmospheric pressure external to outer container 20. Also, first vent opening 136 is open to atmospheric pressure by opening first vent valve 139 during the transfer of the slurry solids into membrane 280. Moreover, with first vent opening 136 open, space 295 may be placed under a relatively small negative pressure, such as approximately 1 pound per square inch gauge (psig), by applying a relatively small vacuum through second vent opening 144 prior to transferring the slurry into membrane 280. With membrane 280 at atmospheric pressure on the inside and a small negative pressure on the outside, membrane 280 becomes inflated prior to filling with slurry solids. In this manner, membrane 280 kept open to accept the slurry solids. As the slurry solids are transferred into membrane 280, a vacuum is applied at apertures 120 and 130 by operating vacuum pump 392. Because dewatering hoses 389 and 390 are connected to apertures 120 and 130, a vacuum is produced in dewatering hoses 389 and 390. Dewatering hoses 389 and 390 are also connected to filters 300 and 310 and are in fluid communication with each associated passageway 340 in filters 300 and 310; thus, the vacuum produced in dewatering hoses 389 and 390 is also produced in each associated passageway 340. Due to the relatively large surface area of filters 300 and 310 and the location of filters 300 and 310 within membrane 280, water interstitially entrained within the slurry solids can be rapidly removed from the slurry solids being transferred into membrane 280. The amount of suctioning can be such that the removal flow rate of the water can be substantially equal to the incoming flow rate of the slurry solids so that water can be simultaneously and rapidly removed from the slurry solids, in the manner described below, as the slurry solids are transferred into membrane 280 and chamber 320.

After a substantial quantity of the slurry solids, such as 75 to 90 percent of the volume of outer container 20, is transferred to membrane 280, the transfer of the slurry solids is terminated and both first aperture 100 and first vent opening 136 formed in upper fill plate 70 are temporarily sealingly closed, thus isolating the inside of membrane 280 from the ambient conditions external to outer container 20. However, the application of the vacuum to dewatering hoses 389 and 390 continues even though first aperture 100 and first vent opening 136 are closed. The differential pressure, which may be approximately 20 to 27 inches of mercury (Hg), existing across membrane 280 due to the application of the vacuum to filters 300 and 310 causes membrane 280 to collapse about and compress the slurry solids. Therefore, the differential pressure across membrane 280 creates a compressive force on the slurry solids therein and reduces the volume of the interstitial spaces, thus forcing the water out of the interstitial spaces in the solids and into each passageway 340. The water is suctioned through passageway 340, guided by drainage grid 350 and flow path 385, and flows into dewatering hoses 389 and 390. This step of the dewatering process is complete when substantially no more water flows through dewatering hoses 389 and 390 and when the applied vacuum reaches a relatively high, stable value. As the next step in this process, first aperture 100 and first vent opening 136 are reopened for transferring more slurry solids into membrane 280. The steps recited hereinabove are repeated until membrane 280 is sufficiently filled with dewatered slurry solids (i.e., separated-out solids). Moreover, vacuum is applied to first conduit 115 and to second conduit 143, using third vacuum pump 397, to confirm that the slurry solids are sufficiently dewatered. That is, when substantially no water flows through first conduit 115 and second conduit 143, the dewatering process is complete. After the dewatering process is completed, outer container 10 is capped by sealingly closing hole 40 using cap assembly 45. At that point apparatus 10 may be lifted using suitable lifting lugs (not shown) integrally attached to apparatus 10. Apparatus 10 may then be placed upon appropriate transportation means for transport to a suitable burial site.

It will be understood that filters 300 and 310 have a relatively large surface area-to-volume. By way of example, if filters 300 and 310 occupy approximately 1 to 2 percent of the volume of outer container 20, a surface flow area of greater than approximately 200 square feet is obtained. This results in a rapid dewatering rate equal to some slurry influent transfer rates. Thus, the operator of apparatus 10 will be able to process more waste in a shorter time using fewer slurry transfers. Also, because there are fewer slurry transfers, less volume of relatively clean flush water that may be used, if desired, for flushing the slurry solids after each transfer of the slurry solids into apparatus 10 need be processed through filters 300 and 310.

The approximately 20 to 27 inches of mercury differential pressure across membrane 280 imparts a substantial squeezing or compressive force or pressure, which may be approximately 10 to 13 psig, on membrane 280 and the dewatered solids therein and mechanically removes water from the mass of slurry solids and causes the water to flow through sheets 330a and 330b and into passageway 340. For some slurries, such as powdered ion-exchange resins, this compressive force reduces the bulk volume of solids by approximately 50 percent when compared to a current method of dewatering.

It will be understood that in the first embodiment of the invention, membrane 280 is not directly attached to outer container 20 because membrane 280 is attached to lower fill plate 220. Moreover, in the first embodiment of the invention lower fill plate 220, which connects bellows 180 to open end 290 of membrane 280, is not part of the containment boundary of outer container 20 because lower fill plate 220 is connected to bellows 180, rather than to outer container 20. Hence, membrane 280 is substantially independent of outer container 20. A substantially independent membrane 280 is preferable because it decreases the likelihood that outer container 20 will fail, by developing a breach therein at the location where membrane 280 could have been connected to outer container 20, due to the torquing and pulling forces acting on membrane 280 during the dewatering process. It is also preferable that membrane 280 be independent of outer container 20 because membrane 280 can be fabricated and fully tested to be leak-free before installation into apparatus 10. Thus, bellows 180 isolates outer container 20 from the movement of membrane 280 as membrane 280 is being filled with slurry solids. This allows membrane 280 to be rapidly filled with slurry solids without significant mechanical loading being imparted to outer container 20. This is important because connecting membrane 280 to upper fill plate 70 via bellows 180 rather than directly to upper fill plate 70 decreases the likelihood of a breach of outer container 20 occurring at the location where upper fill plate 70 is affixed to outer container 20. A fixed (relative to outer container 20) upper fill plate 70 also offers an interface point for quick coupling and decoupling of fill, dewatering and conduit connections. In addition, upper fill plate 70 offers a connection for level probe 150 such that direct level control monitoring from a point fixed relative to outer container 20 is obtained. Moreover, observation window 165 in upper fill plate 70 offers means for direct video monitoring, again, from a fixed point of reference.

If desired, the first embodiment of the invention may use the dewatered solids for internally supporting outer container 20. In this regard, after the slurry solids are sufficiently dewatered, any unused volume between outer container 20 and membrane 280 may be backfilled with a substantially incompressible backfill material 405. Outer container 20, thus filled, is resistant to deformation because, under the imposed burial loads, the dewatered solids 410 and backfill material 405 will not compress further. Outer container 20 then primarily serves a containment or storage function because all external pressures are balanced by an equal and opposite reaction from the dewatered solids 410 and backfill material 405 in outer container 20.

When backfill material 405 is used to internally support outer container 20, the dewatering process described above is first used to dewater and to compress or compact the slurry solids 410. Further compression or compaction of the dewatered slurry solids 410 (i.e., separated-out solids) is achieved by pressurizing space 295 with a gas, such as air, or an incompressible fluid, such as cement grout, while maintaining vacuum on filters 300 and 310. This additional pressure is predetermined based on the particular licensed burial site to which apparatus 10 is to be shipped, but may be in the range of approximately 5 to 40 psig. For dewatered solids that will not re-expand upon release of this additional pressure, the air pressure may then be released and cement grout, similar-setting fluid, or even an inviscid (i.e., non-viscous) granular solid with good flow characteristics, such as relatively small metal spheres or dry sand, is poured into space 295 through second vent opening 144. It will be understood that the combination of dewatered slurry 410 and backfill material 405 will exhibit an incompressible characteristic under the anticipated burial loads which may be in the range of approximately 20 to 50 psig. For resilient dewatered solids 410 that will tend to re-expand upon release of the additional pressure mentioned hereinabove, the additional pressure may be applied by injecting the backfill material 405 into space 295 under positive pressure and holding this positive pressure until any settable backfill, such as cement grout, sets. An alternative process is to overcompress the dewatered solids 410 by higher additional pressures. This higher pressure is then released and backfill material 405 is poured into space 295 before the dewatered solids 410 rebound beyond the necessary final density and hardness required to meet the specified burial conditions.

METHOD OF THE SECOND EMBODIMENT OF THE INVENTION

The method of the second embodiment of the invention contemplates use of apparatus 10 without membrane 280. This method includes transferring, through first aperture 100, the aqueous slurry solids into outer container 20. As the slurry solids are transferred into outer container 20, a vacuum is applied at apertures 120 and 130 by operating first vacuum pump 392. Because dewatering hoses 389 and 390 are sealingly connected to apertures 120 and 130, a vacuum is produced in dewatering hoses 389 and 390 in the manner of the first embodiment of the invention. Due to the relatively large surface area of filters 300 and 310, water interstitially entrained within the slurry solids can be rapidly removed from the slurry solids in the manner of the first embodiment of the invention.

When a predetermined quantity of the slurry solids is transferred into outer container 20, the transfer of the slurry solids is terminated and aperture 100 is temporarily sealingly closed, thus isolating the inside of outer container 20 from the ambient conditions external to outer container 20. However, the application of vacuum to dewatering hoses 389 and 390 continues even though first aperture 100 is closed. The differential pressure existing across the walls of outer container 20 due the application of the vacuum causes outer container 20 to collapse about and compress the slurry solids therein. This step of the dewatering process is complete when substantially no more water flows into dewatering hoses 389 and 390 and when the applied vacuum reaches a relatively high, stable value. As the next step in this method, first aperture is reopened for transferring more slurry solids into outer container 20. The steps recited hereinabove are repeated until outer container 20 sufficiently fills with dewatered slurry solids. Moreover, vacuum is applied to first conduit 115 and second conduit 143 to confirm that the slurry solids are sufficiently dewatered. That is, when substantially no water flows through first conduit 115 and second conduit 143, the dewatering process is substantially complete. After the dewatering process is substantially complete, outer container 10 is capped by sealingly closing hole 40 using cap assembly 45. At that step in the process apparatus 10 may be lifted, using suitable lifting lugs (not shown) integrally attached to apparatus 10, and placed upon appropriate transportation means for transport to a suitable burial site.

METHOD OF THE THIRD EMBODIMENT OF THE INVENTION

The method of the third embodiment of the invention includes transferring, through first aperture 100, the aqueous slurry solids into outer container 20. As the slurry solids are transferred into outer container 20, a vacuum is applied at aperture 120 by operating first vacuum pump 392. Because dewatering pipe 590 is sealingly connected to aperture 120, a vacuum is produced in dewatering pipe 590. Since dewatering pipe 590 is in fluid communication with underdrain 570, the vacuum produced in dewatering pipe 590 is also produced in underdrain 570 and in concave filter 530. Of course, the vacuum produced in concave filter 530 suctions the liquid from the slurry solids because the vacuum produces a differential pressure between the slurry solids and the filter. As the liquid is suctioned from the slurry solids, the liquid filters through fiber sheet 560A and through drainage grid 550. The liquid flows downwardly along drainage grid 550 towards underdrain 570 due to the vacuum produced in dewatering pipe 590 and due to force of gravity. As the liquid reaches underdrain 570, the liquid passes through slots 580, or the pores or further perforations that may be formed in underdrain 570, and into underdrain 570. The vacuum produced in dewatering pipe 590 suctions the liquid from underdrain 570, through dewatering pipe 590, through aperture 120, and into first vacuum line 391. The liquid flowing through first vacuum line 391 then enters first vacuum tank 393. The liquid is removed from first vacuum tank 393 by operating second vacuum pump 395. It will be appreciated that the level of the slurry solids disposed in outer container 20 may be monitored by level probe monitoring unit 155 in the manner of the first embodiment of the invention. It also will be appreciated that the temperature of the slurry solids may be monitored by temperature probe 140 in the manner of the first embodiment of the invention.

Of course, it will be understood that modifications and variations may be effected without departing from the spirit and scope of the novel concepts of the present invention.

Therefore, this invention provides an apparatus for dewatering radioactive waste slurry solids, wherein the apparatus includes means for applying a vacuum to a suitable flexible filter and collapsible membrane combination in which the slurry solids are contained so that the slurry solids are compressively dewatered thereby and further includes means for suitably storing the resulting dewatered slurry solids.

We claim:

1. An apparatus comprising:
   means for removing liquid from a plurality of slurry solids, which could contain radioactive material, including,
   (a) an outer container for providing primary containment for the slurry, said outer container having a first end and having a second end having a top surface thereon, the first end having an opening therethrough;
   (b) an upper fill plate disposed in said outer container, said upper fill plated mounted across the opening for covering the opening;
   (c) a lower fill plate disposed below said upper fill plate;
   (d) means for expressing liquid from slurry including a continuous membrane disposed in said outer container for providing secondary containment for the slurry, said membrane surrounding the slurry for compressing the slurry, said membrane having an open end connected to said lower fill plate, said membrane and said outer container defining a space therebetween;
   a collapsible bellows interposed between said upper fill plate and said lower fill plate, said bellows having one end thereof connected to said upper fill plate and having the other end thereof connected to said lower fill plate for providing unrestricted movement of said lower fill plate and the open end of said membrane connected to said lower fill plate and;
   a plurality of filters disposed in said membrane and in communication with the slurry solids for filtering the liquid from the slurry solids;
   (e) deliquifying means in communication with said filters for suctioning the liquid from said filters and for producing a pressure differential across said membrane, whereby said membrane collapses about the slurry for compressing the slurry.

2. The apparatus according to claim 1, wherein said filters are porous for filtering the liquid therethrough from the slurry.

3. The apparatus according to claim 2, wherein said filters are self-supporting for avoiding use of supporting structure in said outer container to support said filters.

4. The apparatus according to claim 3, wherein said filters are flexible for deflection of said filters.

5. The apparatus according to claim 4, wherein each of said filters is at least two oppositely disposed porous sheets, said sheets defining a passageway therebetween in fluid communication with said deliquifying means.

6. The apparatus according to claim 5, wherein each of said filters further comprises a drainage grid disposed in the passageway for draining the liquid through the passageway and for providing support to and flexibility to each of said filters.

7. The apparatus according to claim 1, further comprising first verification means in fluid communication with the passageway for suctioning the liquid from the passageway and for verifying that a predetermined amount of liquid is removed from the slurry.

8. The apparatus according to claim 1, further comprising second verification means extending through the space defined by said outer container and said membrane, said second verification means having an end thereof disposed near the top surface of the second end of said outer container for suctioning liquid from near the top surface and for verifying that said membrane is liquid-tight.

9. The apparatus according to claim 1, further comprising viewing means connected to said outer container for viewing the interior of said membrane from a position fixed relative to said outer container.

10. The apparatus according to claim 9, further comprising level monitoring means connected to said outer container and extending into said outer container for monitoring the slurry solids level within said membrane from a position fixed relative to said container.

11. The apparatus according to claim 10, further comprising temperature monitoring means connected to said outer container and extending into said outer container for monitoring the temperature of the slurry solids within said membrane.

12. The apparatus according to claim 1, wherein said membrane is collapsible for compressing the slurry.

13. An apparatus comprising: means for dewatering aqueous slurry solids, which could contain radioactive material, including,
  (a) a non-porous generally cylindrical outer container for providing primary containment for the slurry, said outer container having a first end having an opening formed therethrough and having a closed second end opposite the first end, the second end having a top surface thereon facing the first end;
  means for expressing liquid from a slurry including a vertical generally annular first filter having a bottom end, said first filter disposed in said outer container for filtering the water from the slurry solids and;
  a horizontal generally flat second filter extending substantially across the bottom end of said first filter for filtering the water from the slurry solids;
  a non-porous collapsible membrane surrounding said first filter and said second filter for compressing the slurry solids, said membrane having an interior and having an open end having a hole, said membrane and said outer container defining a space therebetween and, a collapsible bellows having two ends, said bellows interposed between said upper fill plate and said lower fill plate, said bellows having one end thereof connected to said upper fill plate and having the other end thereof connected to said lower fillplate for providing unrestricted movement of said lower fill plate and the open end of said membrane;
  (b) an upper fill plate disposed in said outer container, said upper fill plate sealingly connected to the first end of said outer container and mounted across the opening formed through the first end of said outer container for covering the opening,
    (i) said upper fill plate having a first aperture therethrough for filling said membrane with the slurry solids,
    (ii) said upper fill plate having a second aperture therethrough for exit of the water from said outer container,
    (iii) said upper fill plate having a third aperture therethrough for exit of the water from said outer container,
    (iv) said upper fill plate having a fourth aperture therethrough for exit of the water from said outer container,
    (v) said upper fill plate having a fifth aperture therethrough for exit of the water from said outer container,
    (vi) said upper fill plate having a first vent opening therethrough in communication with the interior of said membrane for venting the interior of said membrane, and
    (vii) said upper fill plate having a second vent opening therethrough in communication with the space defined by said outer container and said membrane for venting the space defined by said outer container and said membrane;
  (c) a lower fill plate disposed below said upper fill plate, said lower fill plate connected to the open end of said membrane;
  (d) first dewatering means connected to said first filter for suctioning the water from said first filter; and
  (e) second dewatering means connected to said second filter for suctioning the water from said second filter.

14. The apparatus according to claim 13, wherein each of said first filter and said second filter is porous for filtering the water therethrough.

15. The apparatus according to claim 14, wherein each of said first filter and said second filter is self-supporting for avoiding use of supporting structure in said outer container to support said first filter and said second filter.

16. The apparatus according to claim 15, wherein each of said first filter and said second filter is flexible for allowing deflection of said first filter and said second filter.

17. The apparatus according to claim 16, wherein said first filter and said second filter each further comprises two oppositely disposed porous fiber sheets for filtering the water therethrough, said sheets defining a passageway therebetween, the passageway in said first filter in fluid communication with said first dewatering means, the passageway in said second filter in fluid communication with said second dewatering means.

18. The apparatus according to claim 17, wherein said first filter and said second filter each further comprises a drainage grid disposed in the passageway for draining the water through the passageway.

19. The apparatus according to claim 18, wherein said fiber sheets are porous polyester.

20. The apparatus according to claim 19, wherein said drainage grid further comprises a lattice interposed between said sheets so that each of said first filter and said second filter is flexible and selfsupporting, said lattice having holes therethrough for passage of water and for providing strength to said lattice.

21. The apparatus according to claim 18, wherein said lattice is polyethylene.

22. The apparatus according to claim 13, wherein said first dewatering means further comprises:
  (a) a first dewatering hose having one end thereof connected to the third aperture, said first dewatering hose extending through the open end of said membrane to said first filter, said first dewatering hose in fluid communication with the passageway in said first filter at the other end of said first dewatering hose for withdrawing the water from the passageway;
  (b) a first vacuum tank in fluid communication with the first aperture; and
  (c) a first vacuum pump in communication with said first vacuum tank for applying a vacuum to said first dewatering hose so that the water is suctioned through said first dewatering hose.

23. The apparatus according to claim 22, wherein said second dewatering means further comprises:
  (a) a second dewatering hose having one end thereof connected to the fourth aperture, said second dewatering hose extending through the open end of said membrane to said second filter, said second dewatering hose in fluid communication with the passageway in said second filter at the other end of said second dewatering hose for withdrawing the water from the passageway, said first vacuum pump in fluid communication with the first vacuum tank, said first vacuum tank in fluid communication with the fourth aperture for applying a vacuum to said second dewatering hose so that the water is suctioned from said second dewatering hose; and (b) a second vacuum pump in fluid communication with said first vacuum tank for removing water from said first vacuum tank.

24. The apparatus according to claim 13, further comprising:
(a) a first conduit having one end thereof connected to the second aperture, said first conduit extending to said second filter through the open end of said membrane, said first conduit in communication with the passageway in said second filter at the other end of said first conduit for withdrawing the water from the passageway;
(b) a second vacuum tank in fluid communication with the second aperture; and
(c) a third vacuum pump in fluid communication with said second vacuum tank for applying a vacuum to said first conduit so that the water is suctioned from the passageway in said second filter through said first conduit.

25. The apparatus according to claim 13, further comprising a second conduit having one end thereof connected to the fifth aperture, said second conduit having another end thereof disposed near the top surface of the second end of said outer container and interposed between said outer container and said membrane and extending through the space defined thereby for withdraw- ing water from near the top surface, said third vacuum pump in communication with said second vacuum tank for applying a vacuum to said second conduit so that the water is suctioned from near the top surface through said second conduit.

26. The apparatus according to claim 13, wherein said membrane further comprises a plurality of sleeves attached to the open end of said membrane, said sleeves distributed around the hole in the open end of said membrane.

27. The apparatus according to claim 26, further comprising a plurality of stays connected to said lower fill plate and extending through said sleeves for maintaining the top of said membrane planar.

28. The apparatus according to claim 27, wherein said upper fill plate further comprises a level probe outwardly extending therefrom and through the open end of said membrane for determining the height of the slurry solids in said membrane.

29. The apparatus according to claim 13, wherein said upper fill plate further comprises a temperature probe outwardly extending therefrom and through the open end of said membrane for determining the temperature of the slurry solids in said membrane.

30. The apparatus according to claim 29, further comprising an observation window disposed in said upper fill plate for viewing the interior of said outer container.

31. The apparatus according to claim 30, further comprising backfill material interposed between said outer container and said membrane in the space defined thereby for internally supporting said outer container.

32. The apparatus according to claim 31, wherein said backfill material is a fluid that sets to a solid.

33. The apparatus according to claim 31, wherein said backfill material is a plurality of solid particulates having inviscid flow characteristics.

* * * * *